United States Patent [19]

Tsuru et al.

[11] Patent Number: 5,172,156
[45] Date of Patent: Dec. 15, 1992

[54] CAMERA WITH MINIMUM SUBJECT-DISTANCE ALARM DISPLAY DEVICE

[75] Inventors: Hiroyuki Tsuru, Tokyo; Riichi Higaki, Kawasaki; Yoshikazu Iida, Chigasaki; Akira Katayama, Koganei, all of Japan

[73] Assignee: Nikon Corporation, Tokyo, Japan

[21] Appl. No.: 757,299

[22] Filed: Sep. 10, 1991

[30] Foreign Application Priority Data

Oct. 4, 1990 [JP] Japan .................................. 2-265184

[51] Int. Cl.⁵ .............................................. G03B 13/18
[52] U.S. Cl. .................................... 354/409; 354/127.1; 354/465
[58] Field of Search ............... 354/409, 413, 127.1, 354/471, 465, 421, 289.1, 289.12, 400

[56] References Cited

U.S. PATENT DOCUMENTS

| | | | |
|---|---|---|---|
| 3,696,721 | 10/1972 | Wagner | 354/127.1 X |
| 4,557,578 | 12/1985 | Seely | 354/409 |
| 4,688,921 | 8/1987 | Wakabayashi | 354/127.1 X |
| 5,051,766 | 9/1991 | Nonaka et al. | 354/400 |

Primary Examiner—W. B. Perkey
Attorney, Agent, or Firm—Shapiro and Shapiro

[57] ABSTRACT

A camera with a too-close-subject-distance alarm display device, further comprising a flash device for flashing the light to a subject to be photographed; a selection device for selecting at least the flash exposure mode in which the flash device is permitted to flash or the flash inhibit mode in which the flash device is inhibited to flash; a subject-distance measuring instrument for measuring a subject distance; a decision device for detecting whether the subject distance measured by said distance measuring instrument is less than a predetermined distance or not; an alarm device for alarming when said subject distance measured by said subject-distance measuring instrument is detected to be shorter than said predetermined subject distance by said decision device; and a setting device for setting said predetermined distance to a first predetermined distance when said selection device has selected the flash exposure mode and for setting said predetermined distance to a second predetermined distance longer than the first predetermined distance when the selection device has selected the flash inhibit mode.

1 Claim, 2 Drawing Sheets

CAMERA WITH MINIMUM SUBJECT-DISTANCE ALARM DISPLAY DEVICE

BACKGROUND OF THE INVENTION

1. Field of the Invention

The present invention relates to a camera with a minimum subject-distance alarm display device.

2. Related Background Art

In a conventional camera with a flash apparatus and a minimum subject-distance (that is, the distance from the camera to a subject or object) alarm display device which can inhibit the flash operation of the flash apparatus by the operation from the exterior of the camera, a range at which an alarm signal representative of the minimum subject distance is generated is equal to not only a range at which a flash exposure is permitted (the flash mode) but also a range at which a flash exposure is inhibited (the flash exposure inhibit mode).

There has been also devised and demonstrated a camera of the type in which, in order to maintain a predetermined depth of focus when the subject distance is close so as to avoid a too deep depth of focus, in case of an exposure at a short subject distance, an aperture limit device is provided so that only when an selected aperture is opened wider than the limited aperture, the aperture is narrowed and a flash exposure is carried out by activating a flash apparatus.

However, in the conventional cameras, "the flash mode" distance is equal to "the flash inhibit mode" distance even though the above-mentioned two distances must be different from each other. As a result, distance at which the minimum subject distance is determined becomes erroneous.

In general, the narrower the aperture, the depth of focus is increased and the degree of resolution of camera lens becomes sharper.

When the quantity of flash light is maintained constant and when it is desired to obtain a most optimum exposure, a flash exposure with a narrower depth of focus than a deep depth of focus must be made when a subject distance is closer. That is, a sharply focused exposure can be attained at a relatively closer subject distance when the flash apparatus is flashed. In the "exposure mode", a flash exposure is possible even when the aperture limit is further made narrower by the flash light and the deep depth of focus can be maintained, but in the case of the "flash inhibit mode" when a subject distance is shorter, the aperture can be widened than the limited aperture and the exposure control can carried out so that the depth of focus becomes shallow. Therefore, a distance at which an exposure is made at a closer subject distance is different.

Furthermore, when the "the flash inhibit mode" is selected, there is a fear that an exposure is carried out against the will of a photographer in the case of a camera whose flash apparatus flashes when an aperture is opened wider than the limited aperture.

SUMMARY OF THE INVENTION

In view of the above, the primary object of the present invention is to provide a camera with a limited-subject-distance alarm display device which lets a photographer select whether or not an exposure is made by correctly giving him/her alarm information whether the flash exposure mode or the flash inhibit mode is selected because a subject distance is closer and which even when the flash exposure mode is inhibited, an exposure can be carried out according to the will of the photographer.

In order to attain the above and other objects, in the case of a camera of the type comprising a flash apparatus (B4) for flashing light to the field of view, a selection device (SBS) for selecting at least one of the flash mode in which said flash apparatus can flash and the flash inhibit mode in which said flash apparatus is inhibited to flash, a distance meter (B4) for detecting a distance from a camera to a subject, a sensor (B1) for detecting whether the subject distance detected by said distance meter is closer or longer than a predetermined distance (from said camera) and an alarm device (LED) for generating the close subject distance alarm signal when said distance detected by said sensor is less than a predetermined value, according to the present invention, said camera is characterized by further comprising a setting device for setting said predetermined value in such way that when the flash mode is selected by said selection device, said predetermined value is changed to a first predetermined value, but when said flash inhibit mode is selected by said selection device, said predetermined value is changed to a second predetermined value greater than said first predetermined value.

In the case of the flash mode in which the flashing of said flash apparatus (B4) is permitted and in the case of the flash inhibit mode in which the flashing by said flash apparatus is inhibited, a too-close-subject-distance alarm signal is displayed in response to a correct close-subject-distance at which a too-close-subject-distance alarm is generated depending upon the depth of focus in the case of the flash mode or the flash inhibit mode.

In the flash mode, when a subject distance is short, the flash apparatus (B4) flashes, it becomes possible to obtain an exposure of a subject at a shorter subject distance and the closer-subject-distance alarm signal is displayed at a relatively close subject distance.

In the flash inhibit mode, the flash apparatus (B4) cannot flash so that a distance at which a too-close-subject-distance alarm is displayed is selected at a relatively longer subject distance.

DETAILED DESCRIPTION OF A PREFERRED EMBODIMENT

Figure 1:
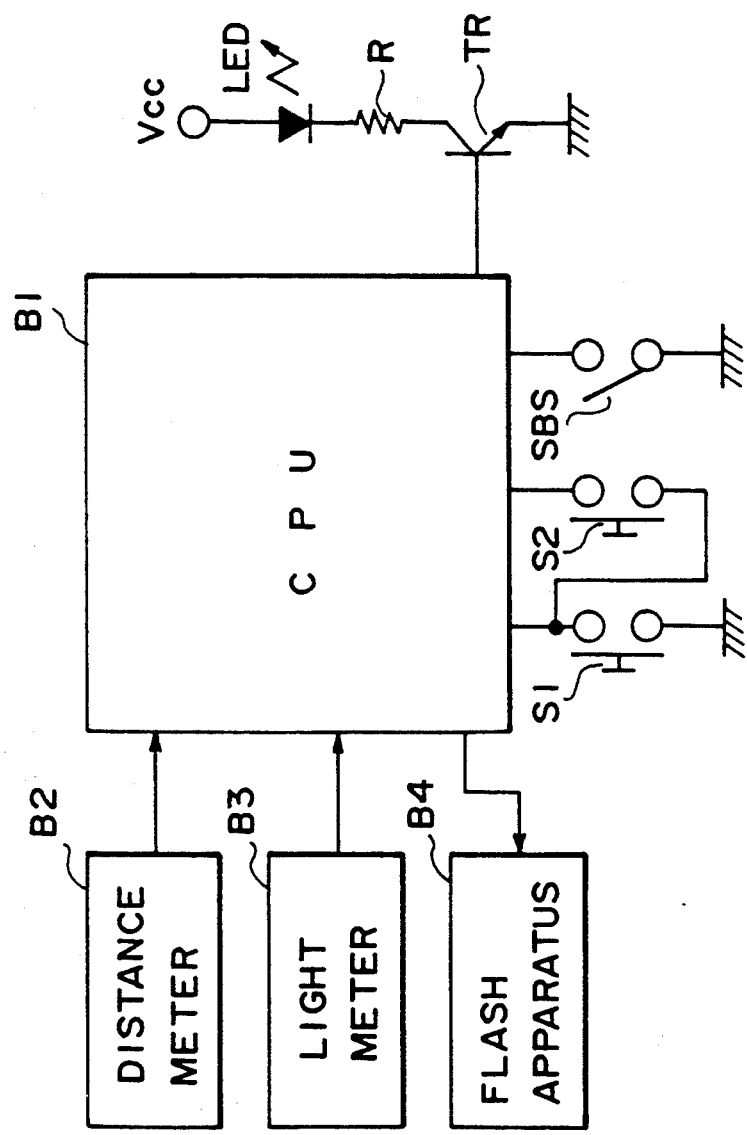
FIG. 1 is a block diagram illustrating the construction of a preferred embodiment of a camera in accordance with the present invention.

Referring first to FIG. 1 illustrating the major components of the preferred embodiment of the present invention, B1 denotes a central processing unit (CPU); and B2, a distance meter for delivering a signal representative of a subject distance to a CPU(B1). B3 represents a light meter for delivering a signal representative of the degree of brightness of a subject to be photographed to CPU(B1); and B4, a flash apparatus for flashing in response to the output signal from CPU(B1) when a shutter (not shown) is released when a subject distance is shorter and/or the brightness of a subject is lower than a predetermined value. S1 indicates a double-stroke switch; and S2, a release switch. The double-stroke switch (S1) and the release switch (S2) constitute a double-stage switch. When the double-stage switch is pushed a half stroke, the double-stroke switch (S1) is turned on and when the double-stage switch is pushed to the end of its stroke, the release switch (S2) is turned on. Such states of the switches (S1) and (S2) are detected by CPU(B1). SBS is a switch for selecting the automatic flash mode or the flash inhibit mode. In this embodiment, it is assumed that when the switch (SBS) is turned on, the flash inhibit mode is selected, but when the switch (SBS) is turned off, the automatic flash mode is selected. LED is a light-emitting diode which flashes for alarming a photographer that a subject to be photographed is too short from the camera. R represents a resistor for controlling the quantity of light emitted from the LED so as to control the brightness. TR denotes a switching transistor which is controlled by CPU(B1). In response to ON-OFF operation of the switching transistor TR the light-emitting diode (LED) is turned on and off. In this embodiment, the light-emitting diode (LED) has been described as being used as an alarm device, but it is understood that a buzzer or the like may be equally used in the present invention.

Figure 2:
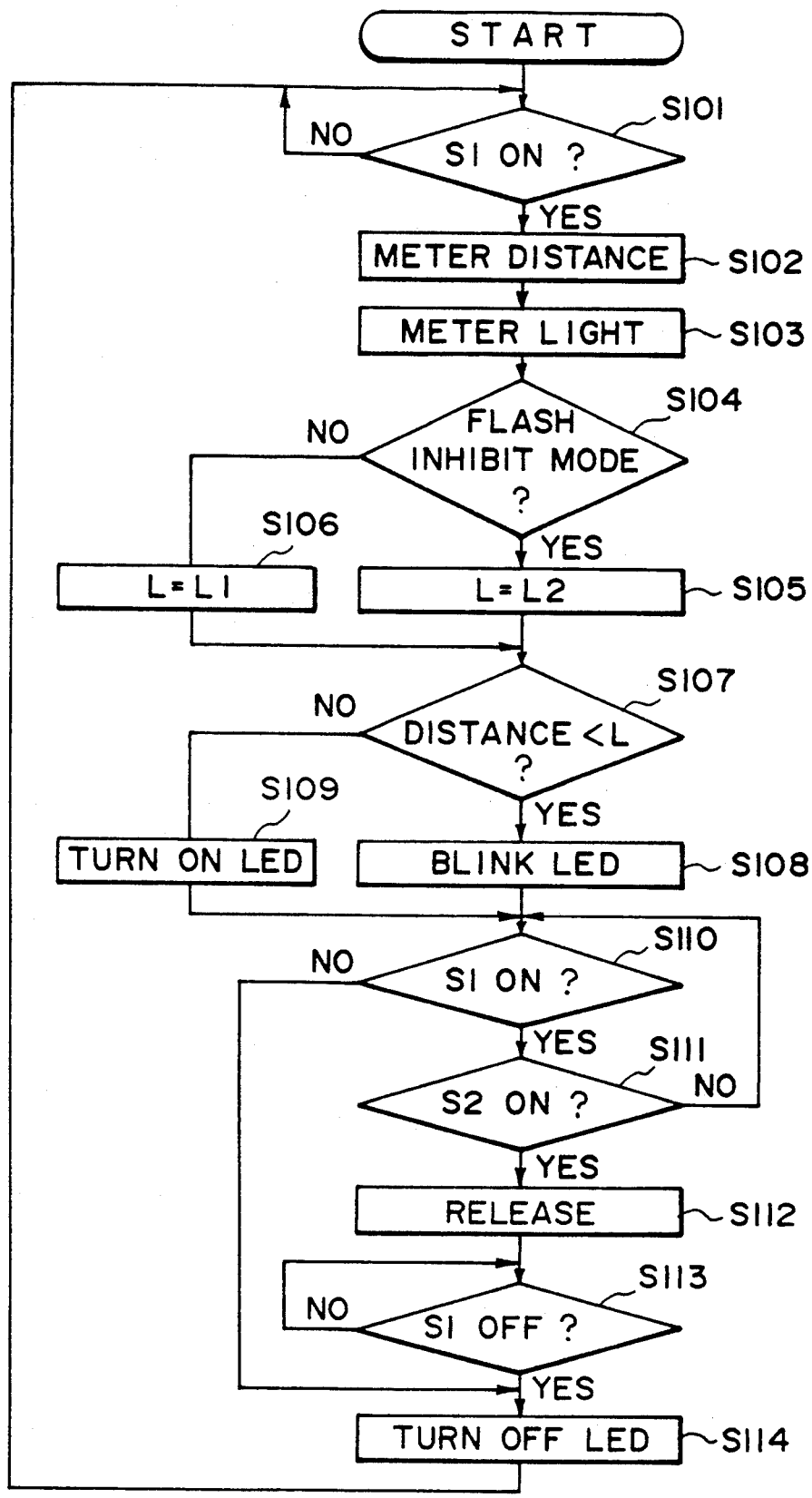
FIG. 2 is a flowchart used to explain the mode of control thereof.

FIG. 2 is a flowchart illustrating the mode of operation of the preferred embodiment with the above-mentioned construction.

The control process of the preferred embodiment of the present invention is started "START" shown in FIG. 2. In the step S101, it is detected whether or not the double-step switch (S1) is depressed and when it is depressed, the procedure proceeds to the step S102, but when it is not depressed, the step S101 is repeated. In the step S102, the distance meter (B2) measures a subject distance. In the step S103, the light meter (B3) measures the brightness of a subject. In the step S104, whether the switch (SBS) is depressed or not is detected. When the switch (SBS) is turned on, the camera is in the flash exposure inhibit mode, the control process proceeds to the step S105, but when the switch (SBS) is turned off, the control process proceeds to the step S106. In the step S105, in the case of the flash inhibit mode, the value of L2 of the close subject distance alarm is substituted into a variable L. The value of L2 is determined depending upon the characteristics of a photographic lens (and is, for instance, one meter). In the step S106, the value of L1 of the close subject distance alarm is substituted into the variable L. The value of L1 is also dependent upon the characteristics of a photographic lens (and is for instance, 0.5 meters). In the step S107, the value of L is compared with the distance obtained in the step S102 and the subject distance measured in the step S102 is shorter than the variable L, the control process proceeds to the step S108, but when the measured subject distance is longer, the control process proceeds to the step S109. In the step S108, the light-emitting diode (LED) blinks to inform to a photographer that the subject is within an exposure range. In the step S111, whether the double-stroke switch (S1) is turned on or off is detected and when the switch is turned on, the control process proceeds to the step S111, but when it is turned off, the process proceeds to the step S114. In the step S111, whether the release switch (S2) is turned on or off is detected and when it is turned on, the control process proceeds to the step S112, but when it is turned off, the process proceeds to the step S110. That is, when the two-stage switches (S1, S2) are turned off in the steps S110 and S111, the control process proceeds to the step S114, but when they are depressed full stroke, the control process proceeds to the step S112. When the two-stroke switches (S1, S2) are depressed half stroke, an exposure is not made and the alarm signal is given to a photographer. In the step S112, in response to the data obtained in the steps S102 and S103, an optimum exposure and an optimum subject distance are set and thereafter the shutter is released for an exposure of the subject. In the case of setting an optimum exposure, an aperture limit control is carried out.

Whether the flash apparatus is flashed or not is detected while the aperture is being controlled. It follows therefore that in the case of a camera capable of informing a photographer whether a flash exposure is made or not, before the step S110, the above-mentioned aperture control must be made.

In the step S113, whether the double-stroke switch (S1) is turned on or off is detected and when it is detected to be turned off, the control procedure proceeds to the step S114, but when the switch is detected to be turned on, the control procedure repeats the step S113. In the step S114, the light-emitting diode (LED) which has been flashing is turned off. Thus the control procedure terminates.

According to the present invention, in both of the flash mode in which the flash apparatus (B4) can flash and the flash inhibit mode in which the operation of the flash apparatus (B4) is inhibited, the close subject-distance alarm is displayed depending upon a correct closer subject-distance at which a close subject-distance alarm is generated depending upon the respective depth of focus so that a photographer or camera person can obtain the information of the limit of the subject distance and consequently the subject distance is not shortened.

When the too-close-subject-distance alarm is displayed, a photographer can release the flash inhibition mode of the flash apparatus (B4) and then releases the shutter button or forcibly release the shutter button even when the subject is out of focus or refrains from the shutter release according to the will of the photographer.

We claim:
1. A camera comprising a camera mechanism and a photographic optical system, further comprising:
a flash means for flashing the light toward a subject to be photographed,
a selection means for selecting at least the flash mode in which said flash means is permitted to flash or the flash inhibit mode in which said flash means is prohibited from flashing,
a distance measuring means for measuring a subject distance,
a decision means for detecting whether the subject distance measured by said distance measuring means is less than a predetermined distance or not,
an alarm means for generating an alarm signal when said decision means has determined that the subject distance measured by said distance measuring means is less than said predetermined distance, and
a setting means for setting said predetermined distance to a first predetermined distance when said selection means has selected said flash mode and for setting said predetermined distance to a second predetermined distance longer than said first predetermined distance when said selection means has selected said flash inhibit mode.

* * * * *